(12) United States Patent
Paul et al.

(10) Patent No.: US 7,498,766 B2
(45) Date of Patent: Mar. 3, 2009

(54) SYSTEM AND METHOD FOR AUTHENTICATING A BATTERY

(75) Inventors: Christopher R. Paul, Bayport, NY (US); Joseph Cabana, Centereach, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 373 days.

(21) Appl. No.: 11/442,942

(22) Filed: May 30, 2006

(65) Prior Publication Data

US 2007/0278992 A1 Dec. 6, 2007

(51) Int. Cl.
*H02J 7/00* (2006.01)

(52) U.S. Cl. ...................................... 320/106; 320/137

(58) Field of Classification Search ................. 320/106, 320/107, 165, 137, 112, 113, 156, 161
See application file for complete search history.

(56) References Cited

U.S. PATENT DOCUMENTS 5,867,006 A 2/1999 Dias et al.

2005/0001589 A1 1/2005 Edington et al.
2005/0010782 A1 1/2005 Ohkubo

FOREIGN PATENT DOCUMENTS

GB 2 416 633 2/2000
WO 99/00863 1/1999

*Primary Examiner*—Akm E. Ullah
*Assistant Examiner*—Aaron Piggush
(74) *Attorney, Agent, or Firm*—Fay Kaplun & Marcin LLP

(57) ABSTRACT

Described is a system and method for authenticating a power source. The system comprises a battery including a first encryption engine storing a first key, and a battery charger including a microcontroller and a second encryption engine storing a second key. When the microcontroller detects a coupling of the battery to the charger, the microcontroller issues a challenge to the first encryption engine and the second encryption engine. The first encryption engine generates a first response as a function of the challenge, the first key and a predefined algorithm, and the second encryption engine generates a second response as a function of the challenge, the second key and the predefined algorithm. The microcontroller compares the first and second responses to authenticate the battery.

15 Claims, 3 Drawing Sheets

SYSTEM AND METHOD FOR
AUTHENTICATING A BATTERY

FIELD OF THE INVENTION

The present invention relates generally to systems and methods for authenticating a battery.

BACKGROUND

A conventional battery charger recharges a rechargeable battery which is used in a wireless electronic device. The charger may be capable of mating with and charging several types of batteries. However, if a different battery is not capable of receiving the same charging voltage and charging rate from the charger as the batteries intended to be recharged by the charger, the different battery may explode, irreparably damaging the charger and potentially causing harm to bystanders. Thus, there is a need to ensure authenticity of a battery which is coupled to the charger.

SUMMARY OF THE INVENTION

The present invention relates to a system and method for authenticating a battery. The system comprises a battery including a first encryption engine storing a first key, and a battery charger including a microcontroller and a second encryption engine storing a second key. When the microcontroller detects a coupling of the battery to the charger, the microcontroller issues a challenge to the first encryption engine and the second encryption engine. The first encryption engine generates a first response as a function of the challenge, the first key and a predefined algorithm, and the second encryption engine generates a second response as a function of the challenge, the second key and the predefined algorithm. The microcontroller compares the first and second responses to authenticate the battery.

DETAILED DESCRIPTION

Figure 1:
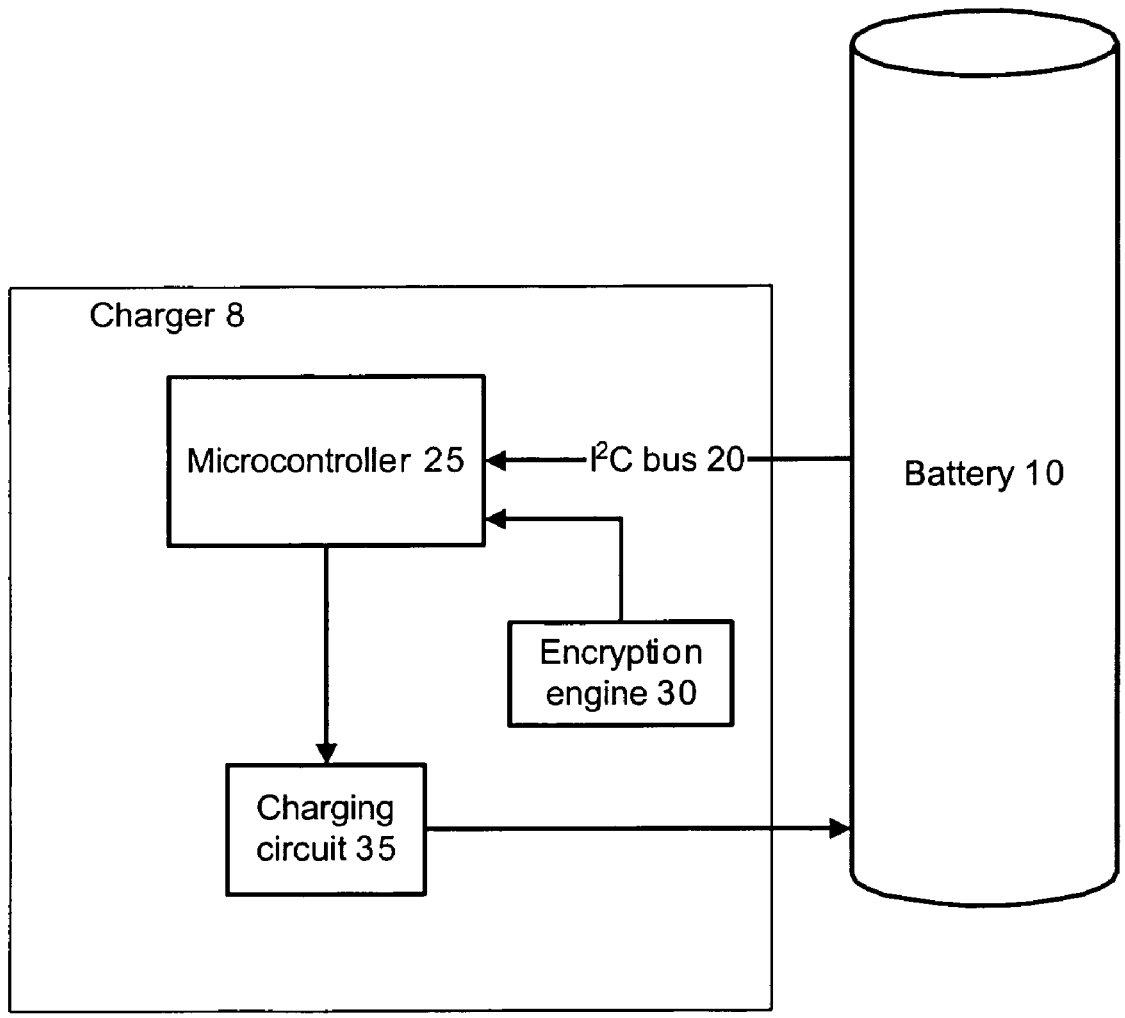
FIG. 1 shows an exemplary embodiment of a system for authenticating a battery according to the present invention.

The present invention may be further understood with reference to the following description and the appended drawings, wherein like elements are referred to with the same reference numerals. The present invention describes a system and method for authenticating a battery. While the exemplary embodiments of the present invention will be described with reference to a charger authenticating the battery, those of skill in the art will understand that the present invention may be utilized by any device which is coupleable to and draws power from and/or provides power to the battery.

FIG. 1 shows an exemplary embodiment of a system 5 according to the present invention in which the system 5 is implemented in a battery charger 8. The charger 8 includes electrical contacts for transferring power from, for example, a line voltage to a battery 10. In other exemplary embodiments, the charger 8 may be wirelessly coupled to the battery 10 for wireless charging (e.g., inductive charging).

Figure 3:
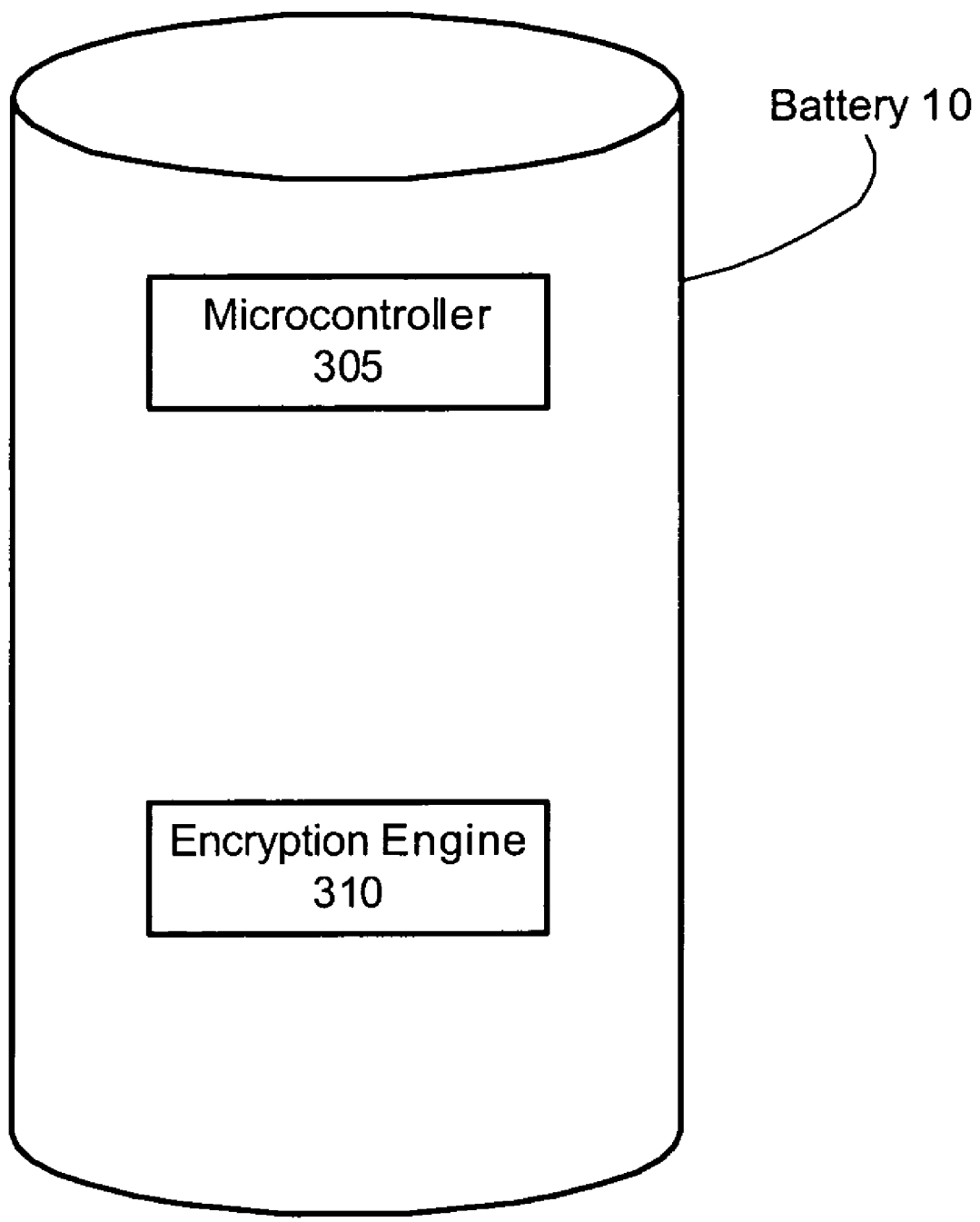
FIG. 3 shows an exemplary embodiment of a battery according to the present invention.

In the exemplary embodiments, the battery 10, as shown in FIG. 3, may be a smart battery which utilizes an integrated circuit to report and/or make available battery data to the charger 8. The battery 10 may include a microcontroller 305 and an encryption engine 310. As will be described further below, the encryption engine 310 executes a predetermined algorithm on a stored battery key in response to an authentication challenge from the charger 8. The battery data may include, but is not limited to, a battery type, a model number, a serial number, a manufacturer identifier, a discharge rate, a predicted remaining capacity, a temperature and a voltage.

In the exemplary embodiment, the charger 8 includes a charging circuit 35 for supplying power to the battery 10, a microcontroller 25 and an encryption engine 30 for authenticating the battery 10, and a communication bus (e.g., an I²C bus 20) for communicating with the microcontroller 305 in the battery 10.

Figure 2:
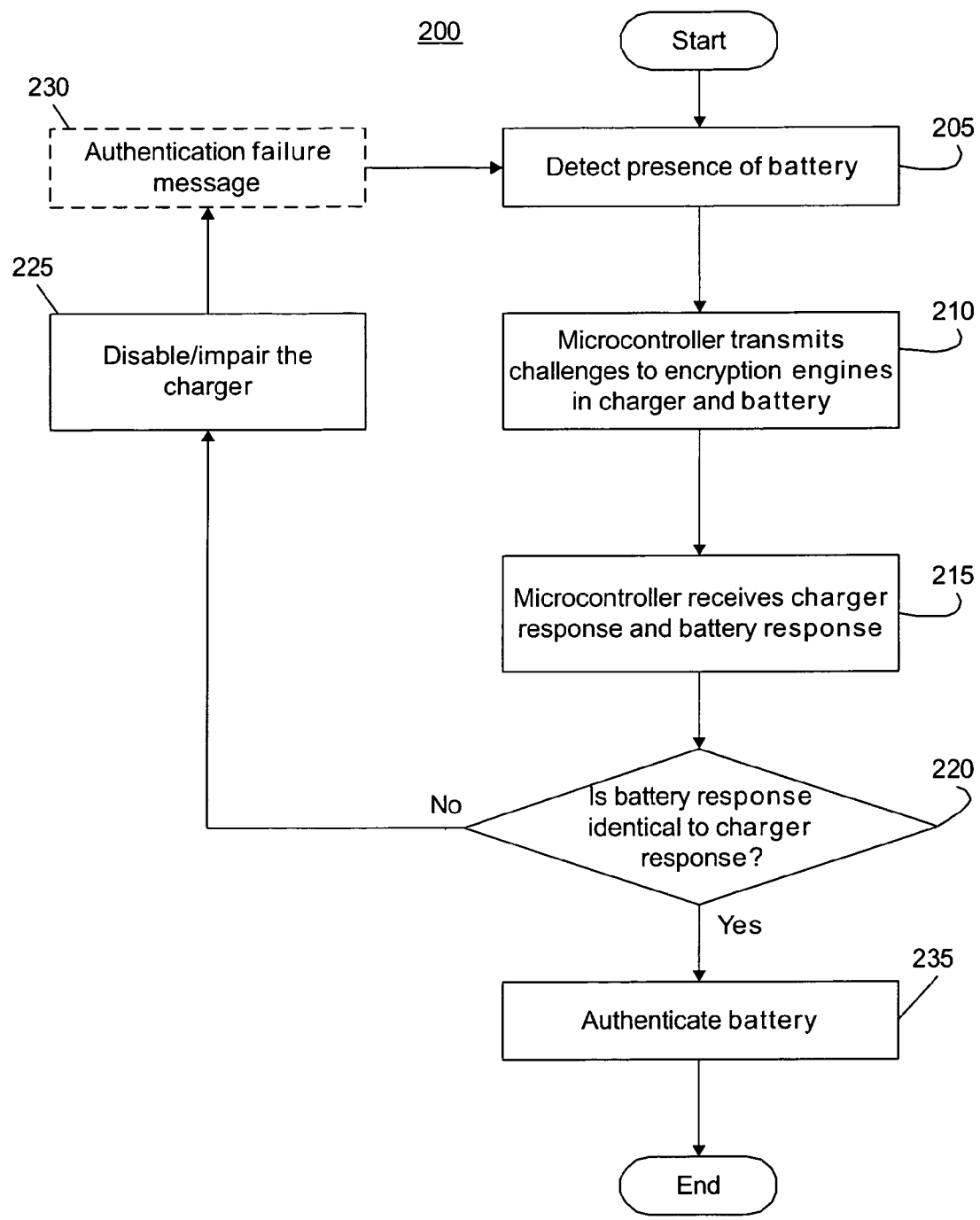
FIG. 2 shows an exemplary embodiment of a method for authenticating a battery according to the present invention.

FIG. 2 shows an exemplary embodiment of a method 200 for authenticating the battery 10 according to the present invention. In step 205, the charger 8 detects a presence of the battery 10 by, for example, monitoring signals on the electrical contacts between the charger 8 and the battery 10. In another embodiment, the charger 8 may include a mechanical mechanism (e.g., a switch, latch, etc.) for detecting a coupling of the battery 10. For example, a two-position switch may indicate an absence of the battery 10 in a first state and a presence of the battery 10 in a second state. Those of skill in the art will understand that any mechanical, electrical, optical, etc. means may be used to detect the coupling of the battery 10 to the charger 8.

In step 210, the microcontroller 25 generates a challenge to obtain a charger response from the encryption engine 30 and to obtain a battery response from the encryption engine 310 in the battery 10. For example, the encryption engine 30 stores a charger key, and, when instructed to do so by the microcontroller 25, generates the charger response based on the challenge, a predefined algorithm (e.g., cyclic redundancy check (CRC), secure hash algorithm (SHA-1), etc.) and the charger key. In the exemplary embodiments, the predefined algorithm is publicly known and the charger key is secret. The charger response may be strongly influenced by the charger key and the challenge, but it would be mathematically impossible to discover the charger key even with knowledge of the charger response, the challenge and the predefined algorithm.

The encryption engine 310 in the battery 10 generates the battery response based on the challenge, the predefined algorithm and a battery key. The predefined algorithm may be the same publicly known algorithm used by the encryption engine 30 to generate the charger response. As described above with reference to the charger response, the battery response may be strongly influenced by the battery key and the challenge, but it would be mathematically impossible to discover the battery key even with knowledge of the battery response, the challenge and the predefined algorithm.

In step 215, the microcontroller 25 receives the charger response from the encryption engine 30 and the battery response from the battery 10. As described above, the microcontroller 25 in the charger 8 communicates with the microcontroller 305 in the battery 10 on the I²C bus 20, allowing exchange of the challenge and the battery response. The microcontroller 305 transfers the challenge to the encryption engine 310 to obtain the battery response.

In step 220, the microcontroller 25 determines whether the battery response is identical to the charger response. When the responses are not identical, the microcontroller 25 may execute a predetermined action on a link between the charger 8 and the battery 10, as shown in step 225. For example, the microcontroller 25 may disable or selectively impair the charging circuit 35. If the charging circuit 25 is disabled, the battery 10 will not receive power from the charger 8. If the charging circuit 35 is selectively impaired, the charging circuit 35 may supply power to the battery 10 at a predetermined charge rate which is selected so that the battery 10 never becomes fully charged, rendering it useless as a power source.

Alternatively, the predetermined charge rate may be selected to ensure that the battery 10 does not explode, i.e., a very slow charge rate.

In optional step 230, an authentication failure message (e.g., LED color change/blink sequence, audible signal, etc.) may be output by the charger 8 to indicate that the battery 10 was not authenticated. The authentication failure message may prompt a user to replace the battery 10. When the charger 8 detects removal and replacement of a battery, the method 200 will repeat itself.

When the responses are identical, the microcontroller 25 may assume (without ever expressly knowing) that the battery key is identical to the charger key and authenticate the battery 10, as shown in step 240.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A system, comprising:
    a battery including a first encryption engine storing a first key; and
    a battery charger including a microcontroller and a second encryption engine storing a second key,
    wherein, when the microcontroller detects a coupling of the battery to the charger, the microcontroller issues a challenge to the first encryption engine and the second encryption engine,
    wherein the first encryption engine generates a first response as a function of the challenge, the first key and a predefined algorithm, and the second encryption engine generates a second response as a function of the challenge, the second key and the predefined algorithm, and wherein the microcontroller compares the first and second responses to authenticate the battery, and
    wherein, when the first and second responses are different, the microcontroller continues the power supplied to the battery at a predetermined charge rate which is selected so that the battery never becomes fully charged.

2. The system according to claim 1, wherein the predefined algorithm is one of a cyclic redundancy check (CRC) and a secure hash algorithm (SHA-1).

3. The system according to claim 1, wherein, when the first and second responses are identical, the microcontroller authenticates the battery.

4. The system according to claim 3, wherein, after the battery is authenticated, the charger supplies power to the battery.

5. The system according to claim 1, wherein the battery is used in a mobile computing device.

6. The system according to claim 5, wherein the mobile computing device includes at least one of a laser-based scanner, an imager-based scanner, a PDA, a mobile phone, a laptop, a tablet computer, a portable media player and a digital camera.

7. A device, comprising:
    a charging circuit supplying power for recharging a battery;
    an encryption engine storing a first key; and
    a microcontroller issuing a challenge, upon coupling of the battery to the device, to (i) the encryption engine to obtain a first response and (ii) a further encryption engine of the battery to obtain a second response, the further encryption engine storing a second key,
    wherein the encryption engine generates the first response using a predefined algorithm, the challenge and the first key, and the further encryption engine generates the second response using the predefined algorithm, the challenge and the second key,
    wherein the microcontroller compares the first and second responses to authenticate the battery, and
    wherein, when the first and second responses are different, the microcontroller continues the power supplied to the battery at a predetermined charge rate which is selected so that the battery never becomes fully charged.

8. The device according to claim 7, wherein the predefined algorithm is one of CRC and SHA-1.

9. The device according to claim 7, wherein, when the first and second responses are identical, the microcontroller allows the charging circuit to deliver power to the battery.

10. The device according to claim 7, wherein the battery is used as a power source for a mobile computing device which includes at least one of a laser-based scanner, an imager-based scanner, a PDA, a mobile phone, a laptop, a tablet computer, a portable media player and a digital camera.

11. A method, comprising:
    detecting a coupling of a battery to a battery charger, the charger including a first encryption engine storing a first key, the battery including a second encryption engine storing a second key;
    issuing a challenge to the first encryption engine to obtain a first response to the second encryption engine to obtain a second response, the first response being generated as a function of the challenge, the first key and a predefined algorithm, the second response being generated as a function of the challenge, the second key and the predefined algorithm;
    authenticating the battery by the charger as a function of a comparison of the first and second responses, and
    when the first and second responses are different, continuing the power supplied to the battery at a predetermined charge rate which is selected so that the battery never becomes fully charged.

12. The method according to claim 11, wherein the predetermined algorithm is one of CRC and SHA-1.

13. The method according to claim 11, wherein the coupling is one of a physical coupling and a wireless coupling.

14. The method according to claim 11, further comprising: when the first and second responses are identical, supplying power to the battery.

15. A device, comprising:
    an encryption means storing a first key; and
    a processing means detecting a coupling of a battery to the device, the processing means issuing a challenge to the encryption means to obtain a first response and to a further encryption means on the battery to obtain a response, the further encryption means storing a second key,
    wherein the encryption means generates the response using a predefined algorithm, the challenge and the first key, and the further encryption means generates the response using the predefined algorithm, the challenge and the second key, and wherein the processing means compares the first and second responses to authenticate the battery, and
    wherein, when the first and second responses are different, the processing means continues the power supplied to the battery at a predetermined charge rate which is selected so that the battery never becomes fully charged.

* * * * *